US012155987B2

(12) United States Patent
Lowson et al.

(10) Patent No.: US 12,155,987 B2
(45) Date of Patent: Nov. 26, 2024

(54) HEADBAND FOR A WEARABLE ELECTRONIC DEVICE

(71) Applicant: Dyson Technology Limited, Wiltshire (GB)

(72) Inventors: Ben Lowson, Shenzhen (CN); Gordon Douglas Bryan Dowdey, Gloucester (GB); Simon Brian McNamee, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 188 days.

(21) Appl. No.: 17/923,324

(22) PCT Filed: Mar. 11, 2021

(86) PCT No.: PCT/GB2021/050606
§ 371 (c)(1),
(2) Date: Nov. 4, 2022

(87) PCT Pub. No.: WO2021/234338
PCT Pub. Date: Nov. 25, 2021

(65) Prior Publication Data

US 2023/0209243 A1 Jun. 29, 2023

(30) Foreign Application Priority Data

May 18, 2020 (GB) ..................................... 2007319

(51) Int. Cl.
*H04R 1/10* (2006.01)
*A62B 18/00* (2006.01)

(52) U.S. Cl.
CPC ........... *H04R 1/105* (2013.01); *A62B 18/006* (2013.01); *H04R 1/1008* (2013.01); *H04R 1/1025* (2013.01); *H04R 1/1075* (2013.01)

(58) Field of Classification Search
CPC .... H04R 1/105; H04R 1/1008; H04R 1/1025; H04R 1/1075; A62B 18/006
(Continued)

(56) References Cited

U.S. PATENT DOCUMENTS 4,882,745 A 11/1989 Silver
5,095,382 A 3/1992 Abe
(Continued)

FOREIGN PATENT DOCUMENTS

CN 205316493 U 6/2016
CN 205586374 U 9/2016
(Continued)

OTHER PUBLICATIONS

International Search Report and Written Opinion received for PCT Patent Application No. PCT/GB2021/050606, mailed on Jun. 7, 2021, 10 pages.
(Continued)

*Primary Examiner* — Sean H Nguyen
(74) *Attorney, Agent, or Firm* — Tucker Ellis LLP; Michael G. Craig

(57) ABSTRACT

A headband for a wearable electronic device includes a first end portion, a second end portion, and a central portion disposed between the first and second end portions. The first end portion is connected to the central portion by an extension mechanism for adjusting a length of the headband, and the first end portion includes a battery compartment for receiving a battery.

18 Claims, 6 Drawing Sheets

(58) Field of Classification Search
USPC .......................................................... 381/378
See application file for complete search history.

(56) References Cited

U.S. PATENT DOCUMENTS

| | | | | |
|---|---|---|---|---|
| 5,357,585 | A * | 10/1994 | Kumar ................. | H04R 1/1008 381/384 |
| 5,640,458 | A | 6/1997 | Nishiguchi et al. | |
| 5,708,725 | A | 1/1998 | Ito | |
| 5,721,775 | A | 2/1998 | Leifer | |
| 5,793,865 | A | 8/1998 | Leifer | |
| 6,236,969 | B1 | 5/2001 | Ruppert et al. | |
| 7,155,025 | B1 | 12/2006 | Weffer | |
| 7,377,666 | B1 | 5/2008 | Tyler | |
| 7,634,082 | B2 | 12/2009 | Medhin | |
| 8,649,547 | B2 | 2/2014 | Hsu Huang et al. | |
| 9,076,421 | B1 | 7/2015 | Munoz | |
| 9,571,919 | B2 | 2/2017 | Hsu Huang et al. | |
| 9,872,106 | B2 | 1/2018 | Vroom et al. | |
| 10,341,760 | B2 | 7/2019 | Mann | |
| 10,470,708 | B2 | 11/2019 | Antos et al. | |
| 10,499,135 | B2 | 12/2019 | Lee et al. | |
| 10,579,135 | B2 | 3/2020 | Urbach et al. | |
| 11,973,257 | B2 * | 4/2024 | Woods, Jr. ............... | H01Q 3/28 |
| 2001/0022843 | A1 | 9/2001 | Nishiguchi et al. | |
| 2001/0032071 | A1 | 10/2001 | Burchard et al. | |
| 2002/0003889 | A1 | 1/2002 | Fischer | |
| 2002/0076060 | A1 | 6/2002 | Hall et al. | |
| 2011/0135134 | A1 | 6/2011 | Essabar et al. | |
| 2011/0142249 | A1 | 6/2011 | Shinozaki | |
| 2012/0308068 | A1 | 12/2012 | Hsu Huang et al. | |
| 2012/0328143 | A1 * | 12/2012 | Ohtani ................. | H04R 1/1025 381/384 |
| 2013/0343591 | A1 | 12/2013 | Brunner et al. | |
| 2015/0092972 | A1 | 4/2015 | Lai et al. | |
| 2016/0173968 | A1 | 6/2016 | Fargeau et al. | |
| 2016/0192051 | A1 | 6/2016 | Dipiazza et al. | |
| 2016/0241947 | A1 | 8/2016 | Degraye et al. | |
| 2016/0317085 | A1 | 11/2016 | Razavi et al. | |
| 2017/0264984 | A1 | 9/2017 | Pelland | |
| 2017/0339484 | A1 | 11/2017 | Kim | |
| 2018/0206023 | A1 | 7/2018 | Lee et al. | |
| 2019/0037296 | A1 | 1/2019 | Mihara et al. | |
| 2019/0230429 | A1 | 7/2019 | Bozaglo et al. | |

FOREIGN PATENT DOCUMENTS

| | | | |
|---|---|---|---|
| CN | 106823178 | A | 6/2017 |
| CN | 107233675 | A | 10/2017 |
| CN | 105571010 | B | 5/2018 |
| CN | 109218892 | A | 1/2019 |
| CN | 208971749 | U | 6/2019 |
| DE | 202017100370 | U1 | 2/2017 |
| EP | 0389174 | B1 | 5/1995 |
| EP | 2352307 | B1 | 8/2012 |
| EP | 2999237 | A1 | 3/2016 |
| GB | 2490553 | A | 11/2012 |
| GB | 2517486 | A | 2/2015 |
| KR | 10-2003-0042051 | A | 5/2003 |
| KR | 10-1808253 | B1 | 12/2017 |
| KR | 10-2018-0003946 | A | 1/2018 |
| KR | 10-2018-0129724 | A | 12/2018 |
| WO | 2005/096666 | A1 | 10/2005 |
| WO | 2012/094176 | A2 | 7/2012 |
| WO | 2014/209774 | A1 | 12/2014 |
| WO | 2020/021233 | A1 | 1/2020 |
| WO | 2020/107605 | A1 | 6/2020 |

OTHER PUBLICATIONS

Search Report received for GB Patent Application No. 2007319.3, mailed on Oct. 5, 2020, 2 pages.

* cited by examiner

HEADBAND FOR A WEARABLE ELECTRONIC DEVICE

CROSS-REFERENCE TO PRIOR APPLICATION

This application is a § 371 National Stage Application of PCT International Application No. PCT/GB2021/050606 filed Mar. 11, 2021, which claims the priority of United Kingdom Application No. 2007319.3, filed May 18, 2020, each of which are herein incorporated by reference in their entirety.

FIELD OF THE INVENTION

The present application relates to a headband for a wearable electronic device, and a wearable electronic device comprising such a headband.

BACKGROUND OF THE INVENTION

Head wearable electronic devices, for example headphones, are typically provided with a headgear that enables the electronic device to be properly located with respect to the head of the wearer. Such headgear can take the form of a headband which overlies at least a portion of a head of the wearer in use. There is a desire for head wearable electronic devices to be supported in manner which is comfortable for a wearer in use.

SUMMARY OF THE INVENTION

According to a first aspect of the present invention there is provided a headband for a wearable electronic device, the headband comprising a first end portion, a second end portion, and a central portion disposed between the first and second end portions, the first end portion connected to the central portion by an extension mechanism for adjusting a length of the headband, wherein the first end portion comprises a battery compartment for receiving a battery.

The headband according to the first aspect of the present invention may be beneficial principally as the first end portion is connected to the central portion by an extension mechanism for adjusting a length of the headband, and the first end portion comprises a battery compartment for receiving a battery.

In particular, as the first end portion comprises a battery compartment for receiving a battery, the location of a battery which powers a wearable electronic device in use may be such that the weight of the battery is located in the first end portion of the headband, which may provide increased comfort for a wearer, for example relative to an arrangement in which a battery is located in a central portion of a headband which directly overlies a head of a wearer in use. As the battery is located in the first end portion as opposed to the central portion, the central portion may be provided with more padding than an arrangement in which the battery is within the central portion, which may provide increased comfort for the wearer.

Furthermore, by connecting the first end portion to the central portion by an extension mechanism, the headband may provide adjustability which enables a wearer to adjust for increased comfort in use. Thus the headband according to the first aspect of the present invention may provide for increased wearer comfort relative to previously proposed headbands.

Location of the battery in an end portion of the headband as opposed to the central portion of the headband may also ensure that battery is closer to an electronic device supported by the headband, which may reduce a length of wiring required from a battery to an electronic device, and hence may reduce power loss.

The central portion may be configured to overlie a top of a head of a wearer in use, and may, for example, be configured to contact a top of a head of a wearer in use. The first end portion and/or the second end portion may be configured to at least partially overlie a side portion of a head of a user in use, and may, for example, be configured to contact a side of a head of a wearer in use. Any or any combination of the central portion and the first and second end portions may comprise padding configured to contact a relevant portion of a head of a wearer in use. Such padding may provide increased comfort for a wearer.

The central portion may be configured to contact a head of a wearer in use whilst the first and second end portions are spaced apart from a head of a wearer in use. This may enable the headband to be appropriately supported by the central portion whilst the first end portion, and hence the battery compartment and any associated battery and weight thereof, are removed from direct contact with the head of the wearer. Furthermore, spacing between the battery compartment and a wearer's head may provide for better heat distribution and increased wearer comfort relative to an arrangement where a battery compartment contacts a head of a wearer. Spacing the first and second end portions away from a head of a wearer may also reduce an amount of padding required for the first and second end portions, which may reduce a cost of manufacture.

The headband may comprise one or more connectors for connecting to a housing of an electronic component of a wearable electronic device. The first end portion, for example the battery compartment, may comprise a connector for connecting to a housing of an electronic component of a wearable electronic device. The connector may be configured to provide a mechanical connection which enables the housing of an electronic component of a wearable electronic device to be supported by the headband, and allow for an electrical connection which enables electrical power to be transferred from a battery received within the battery compartment to an electronic component of a wearable electronic device in use. The connector may be configured to provide relative motion between the headband and the housing of an electronic component of a wearable electronic device, and this may provide for increased flexibility and comfort for a wearer relative to a static connection. The connector may be a releasable connector, which may, for example, enable the headband to be removed from the housing of an electronic component of a wearable electronic device in use.

The battery compartment may be configured to receive a removable battery, and may, for example, comprise an openable housing which enables insertion and/or removal of a removable battery. The battery compartment may be configured to receive a rechargeable battery, and may, for example, comprise a housing which is not intended to be accessible to a wearer in normal use. The battery compartment may comprise a charging port which enables recharging of a rechargeable battery located within the battery compartment. Alternatively, a charging port may be provided on a housing of the electronic component with an electrical connection extending between the charging port and the battery compartment.

The battery compartment may be configured to receive a plurality of batteries such that the plurality of batteries are positioned adjacent to one another with end faces of adjacent batteries at least partially facing one another, and the plurality of batteries are positioned such that an oblique angle is defined between central axes, for example central longitudinal axes, of adjacent batteries. This may provide increased energy storage capacity, whilst allowing the battery compartment to be shaped to conform to the contours of a head of a wearer. This may provide increased comfort relative to, for example, a linear battery compartment.

Batteries typically are of a cylindrical or prismatic form, comprising opposing end faces which are flat and parallel to one another. By having a battery compartment configured such that end faces of adjacent batteries at least partially face one another and define an oblique angle therebetween, a curve of a wearers head can be approximated. The battery compartment may be configured to receive a plurality of batteries such that an obtuse angle is defined between central axes of adjacent batteries, for example an angle in the range of 130°-170° or 150-170°.

One of the first end portion and the central portion may comprise a male connector, and the other of the central portion and the first end portion may comprise a female connector for receiving the male connector, the male and female connectors configured to allow relative motion between the first end portion and the central portion, and configured to retain the first end portion and the central portion at a plurality of positions relative to one another. This may be beneficial as it may enable a length of the headband to be increased whilst allowing retention at a desired length, which may allow for increased comfort of a wearer. This may also provide a simple mechanism, which may be relatively inexpensive and straightforward to manufacture. Relative motion between the first end portion and the central portion may comprise translational motion, and may, for example, comprise linear or curvilinear motion.

One of the first end portion and the central portion may comprise a male telescoping connector, and the other of the central portion and the first end portion may comprise a female telescoping connector for receiving the male telescoping connector. This may enable telescopic motion between the first end portion and the central portion. The central portion may comprise the male telescoping connector and the first end portion may comprise the female telescoping connector.

The extension mechanism may comprise a retention mechanism, with at least one of the first end portion and the central portion comprising teeth which are engageable to allow the first end portion and the central portion to be retained at different distances relative to one another.

The extension mechanism may be configured to retain the first end portion and the central portion at a plurality of discrete positions relative to one another, or at a continuous range of distances relative to one another. A continuous range may provide more flexibility, and possibly increased comfort, for a wearer, but such an extension mechanism may be more complex and costly to manufacture. An extension mechanism configured to retain the first end portion and the central portion at a plurality of discrete positions relative to one another may be simpler and cheaper to manufacture, but may provide limited options for a wearer.

The second end portion may comprise a further battery compartment for receiving a further battery. This may provide the headband with increased battery storage capacity, which may provide increased energy levels to provide to a wearable electronic device connected to the headband in use, whilst also providing a balanced weight distribution by having battery compartments at both the first and second end portions. For example, the first and second portions may be at opposing ends of the headband. The first and second end portions may be configured to be at substantially opposite sides of a head of a wearer in use.

The further battery compartment may be configured to receive a plurality of further batteries such that the plurality of further batteries are positioned adjacent to one another with end faces of adjacent further batteries at least partially facing one another, and the plurality of further batteries are positioned such that an oblique angle is defined between the end faces of adjacent batteries. This may provide increased energy storage capacity, whilst allowing the further battery compartment to be shaped to conform to the contours of a hear of a wearer. This may provide increased comfort relative to, for example, a linear battery compartment.

The battery compartment and the further battery compartment may be configured to house equal numbers of batteries. This may be beneficial as it may provide even weight distribution of batteries at the first and second end portions, and hence may provide improved weight distribution across the headband when worn by a wearer, thereby leading to increased comfort.

The second end portion may be connected to the central portion by a further extension mechanism for adjusting the length of the headband. This may provide further flexibility in the length of the headband, which may allow for increased comfort for a wearer of the headband in use.

The extension mechanism and the further extension mechanism may comprise the same type of extension mechanism. This may allow for easier manufacture compared to an arrangement where two types of extension mechanism are used, and may allow for use of the same components, which may provide cost and time savings during manufacture.

According to a second aspect of the present invention there is provided a wearable electronic device comprising a headband according to the first aspect of the present invention.

The first end portion of the headband may be connected to a housing within which an electronic component is disposed, the electronic component configured to be powered by a battery received within the battery compartment in use.

The first end portion and the housing may comprise cooperating connectors which are configured to provide a mechanical connection and enable an electrical connection between a battery housed in the battery compartment and the electronic component housed within the housing. The cooperating connectors may be configured to provide relative motion, for example relative rotational motion, between the first end portion and the housing, and this may provide for increased flexibility and comfort for a wearer relative to a static connection. The cooperating connectors may comprise releasable connectors, which may, for example, enable the headband to be removed from the housing.

The electronic component may comprise one or more of a speaker and an airflow generator for generating an airflow. For example, the wearable electronic device may comprise any of a headphone, a head wearable air purifier, and a head wearable air purifier incorporating a speaker.

The second end portion of the headband may be connected to further housing within which a further electronic component is disposed.

The further electronic component may be configured to be powered by a battery received within the battery compartment in use. This may be beneficial as one battery compartment may be required to provide power to both the electronic component and the further electronic component.

The electronic component and the further electronic component may both be configured to be powered by the battery received within the battery compartment and by a further battery received within the further battery compartment in use. The electronic component and the further electronic component may be configured to each be powered by all batteries received within the battery compartment and the further battery compartment in use. This may provide the possibility to provide increased power levels to either or both of the electronic component and further electronic component.

The further electronic component may be configured to be powered by a further battery received within the further battery compartment in use. Providing power to the electronic component and the further electronic component from different power sources, ie different batteries disposed if different battery compartments, may allow for increased functionality relative to an arrangement where a single power source powers both the electronic component and the further electronic component. This may, for example, provide redundancy in that one of the electronic component and the further electronic component can still be provided with power should power supply to the other of the further electronic component and the electronic component fail.

The further electronic component may comprise one or more of a speaker and an airflow generator for generating an airflow.

The wearable device may comprise a nozzle for providing airflow from an airflow generator to a wearer of the wearable electronic device in use.

According to a third aspect of the present invention there is provided a wearable air purifier comprising a headband according to the first aspect of the present invention.

According to a fourth aspect of the present invention there is provided a wearable air purifier comprising: a headband, the headband comprising a first end portion, a second end portion, and a central portion disposed between the first and second end portions, the first end portion connected to the central portion by an extension mechanism for adjusting a length of the headband, wherein the first end portion comprises a battery compartment for receiving a battery; an air purifier assembly supported by the headgear, the air purifier powered by a battery housed within the battery compartment, and configured to generate a filtered airflow, in use; and a nozzle comprising an air inlet for receiving the filtered airflow from the air purifier assembly, and an air outlet for emitting the filtered airflow from the nozzle.

Features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
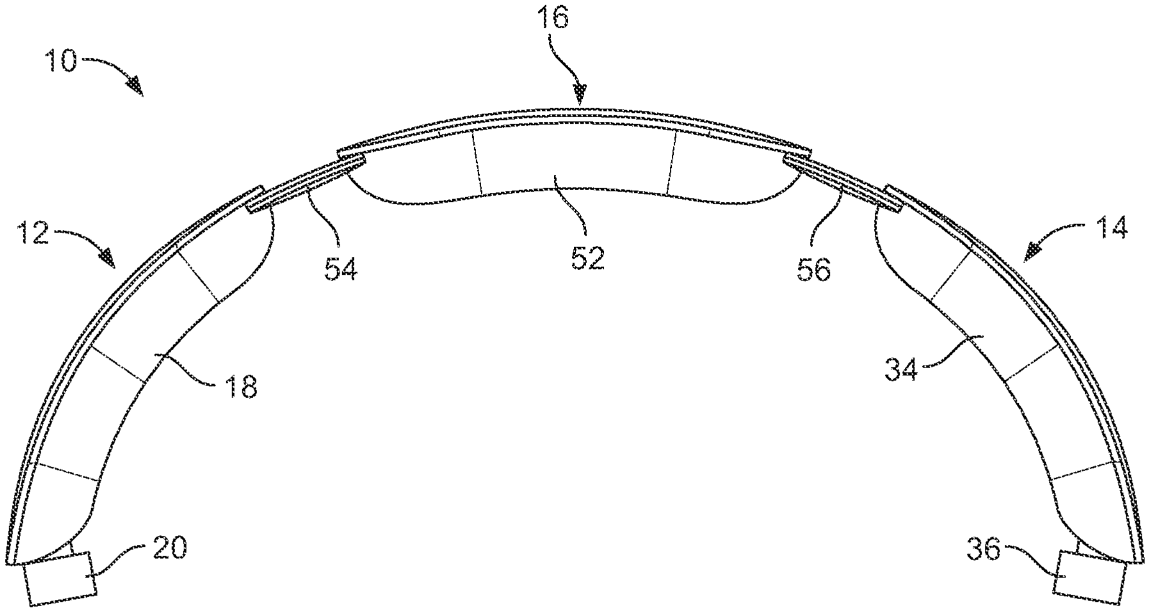
FIG. 1 is a schematic front view of a headband according to a first aspect of the present invention.
Figure 2:
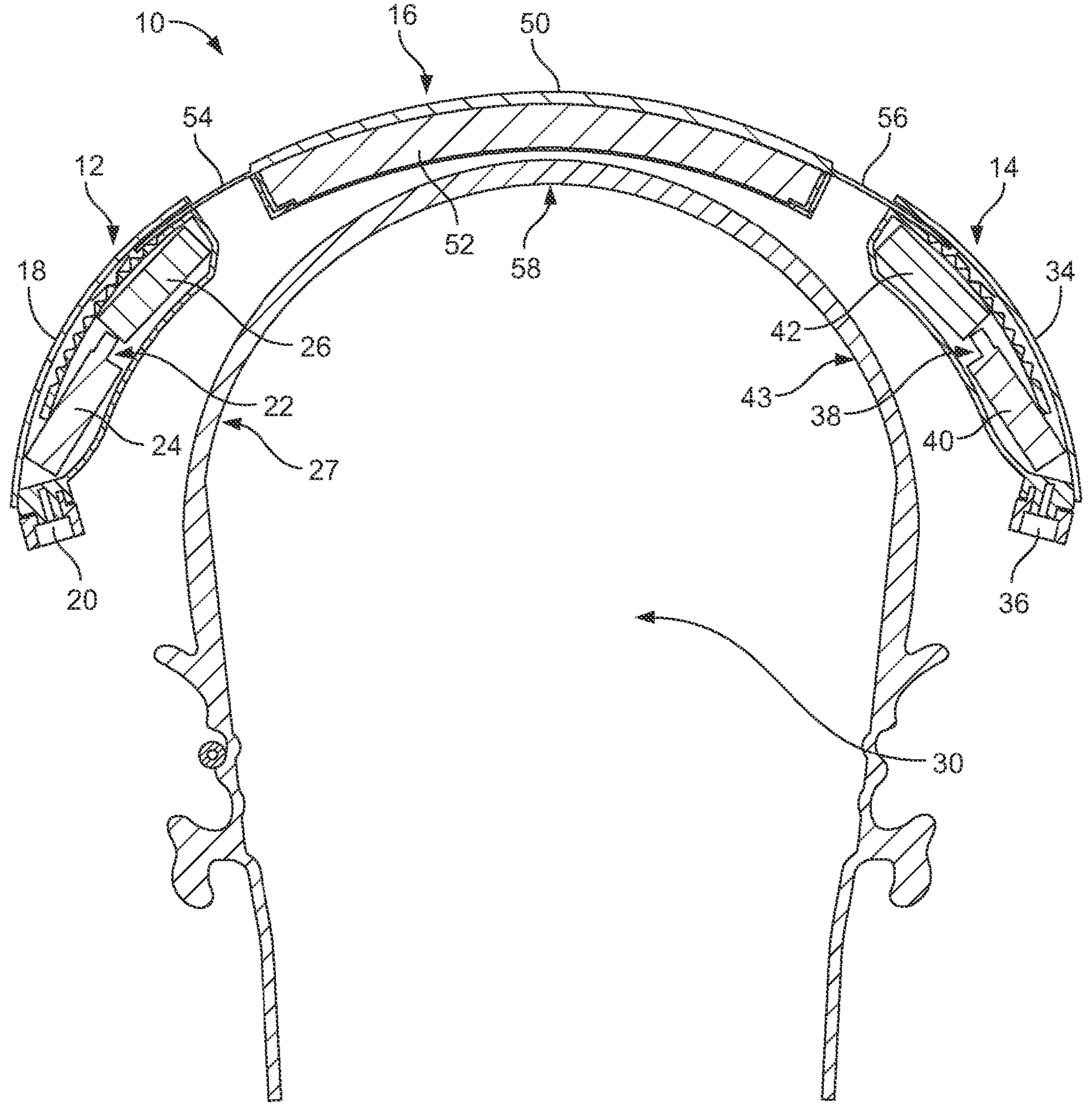
FIG. 2 is a schematic cross-sectional view of the headband of FIG. 1.

A headband, generally designated 10, for a wearable electronic device 100,200 is shown in FIGS. 1 and 2.

The headband 10 comprises a first end portion 12, a second end portion 14, and a central portion 16. The first end portion 12 and the second end portion 14 are connected to the central portion 16 via respective first and second arms, 54,56, as will be described.

The first end portion 12 has a housing 18 and a swivel connector 20 for connecting to a first electronic component housing 102. The housing 18 is hollow, and has an internal chamber 22 that houses first 24 and second 26 batteries. Thus the housing 18 acts as, and may also be referred to as, a first battery compartment. As shown the housing 18 has upper and lower housing portions, but it will be recognised that other variations with different numbers of housing portions are readily achievable by a person skilled in the art.

Figure 3:
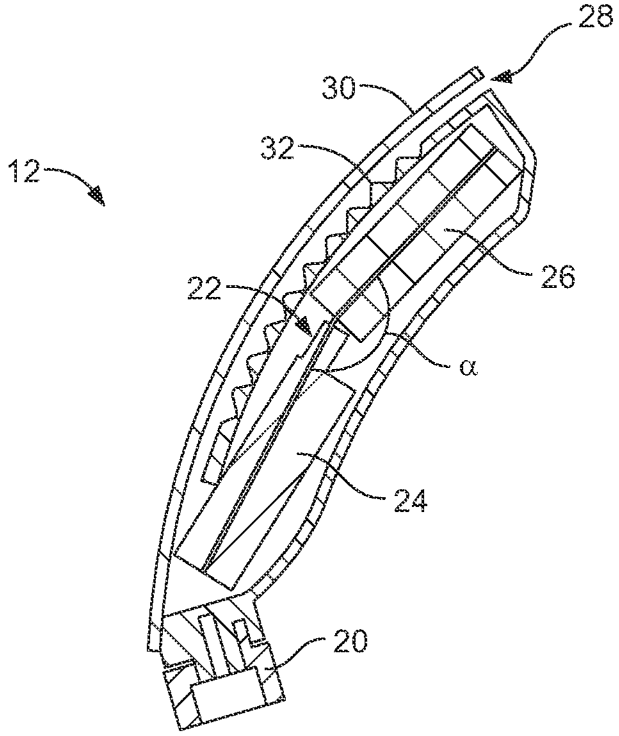
FIG. 3 is an enlarged view of a first end portion of the headband of FIG. 2.

The housing 18 is curved with the same general curvature as the headband 10, and is shaped to follow a similar curvature to that of a first side portion 27 of a head 30 of a wearer. The first 24 and second 26 batteries are arranged end-on-end within the housing 18 such that end faces of the first 24 and second 26 batteries are adjacent to, and at least partially face, one another, with an oblique angle defined between central longitudinal axes of the first 24 and second 26 batteries. The use of multiple batteries 24, 26 in such a non-linear arrangement optimises the use of the space available within the curved housing 18 and therefore maximises the energy storage capacity provided by the housing 18. In the present embodiment the angle, denoted by $\alpha$ in FIG. 3 is obtuse, and is in the range of 130-170°. Such an obtuse angle may generally match a curvature of ahead of a wearer.

It will be appreciated that the first 24 and second 26 batteries may be removable from the housing 18, or may be intended to be retained within the housing 18 during normal use. Where the first 24 and second 26 batteries are intended to be replaceable, the housing 18 may, for example, comprise a releasable door or cover to enable access to the internal chamber 22, and hence may comprise a two-part housing. Where the first 24 and second 26 batteries are rechargeable and intended to be retained within the housing 18 in normal use, the housing 18, or indeed other components of the wearable electronic device 100,200, for example an electronic component housing, may comprise at least one charge port to enable recharging of the first 24 and second 26 batteries. Where the charge port is remote from the housing 18, an appropriate electrical connection, for example wiring, may extend between the charge port and the housing 18.

The first end portion 12 is shown in a close-up cross-sectional view in FIG. 3. As can be seen, the housing 18 defines a channel 28 for receiving the first arm 54 of the central portion 16. The channel 28 has a smooth wall 30, and a toothed wall 32. Here the toothed wall 32 at least partly defines the internal chamber 22. The toothed wall 32 engages in use with the first arm 54 of the central portion 16 so as to retain the central portion 16 at various positions relative to the first end portion 12. In such a manner the length of the headband 10 may be adjusted by motion of the first arm 54 into and out of the channel 28, and hence may be thought of as an extension mechanism for adjusting a length of the headband 10. It will be appreciated that the engagement between the first arm 54 and the toothed wall 32 is sufficient to enable retention of the relative positioning of the first end portion 12 and the central portion 16 in the absence of any applied force by a user. To this end, teeth of the toothed wall 32, the spacing between the toothed wall 32 and the smooth wall 30, or the arm 54 itself, may be sufficiently resilient to provide the required retention.

The swivel connector 20 is a conventional swivel connector that enables relative rotational movement, and comprises a recess or socket for receiving a swivel pin 108, 208 (see FIGS. 5 and 7) of the first electronic component housing 102,202, such that the swivel pin 108, 208 rotates within the recess in use.

The second end portion 14 is located at an opposite end of the headband 10 to the first end portion 12. The second end portion 14 has the same form as the first end portion 12, and utilises the same components. The headband 10 may be described as symmetric about a central axis extending through a centre line of the central portion 16.

The second end portion 14 has a housing 34 and a swivel connector 36 for connecting to a second electronic component housing 104, 204. The housing 34 is hollow, and has an internal chamber 38 that houses third 40 and fourth 42 batteries. Thus the housing 34 acts as, and may also be referred to as, a second battery compartment.

Figure 4:
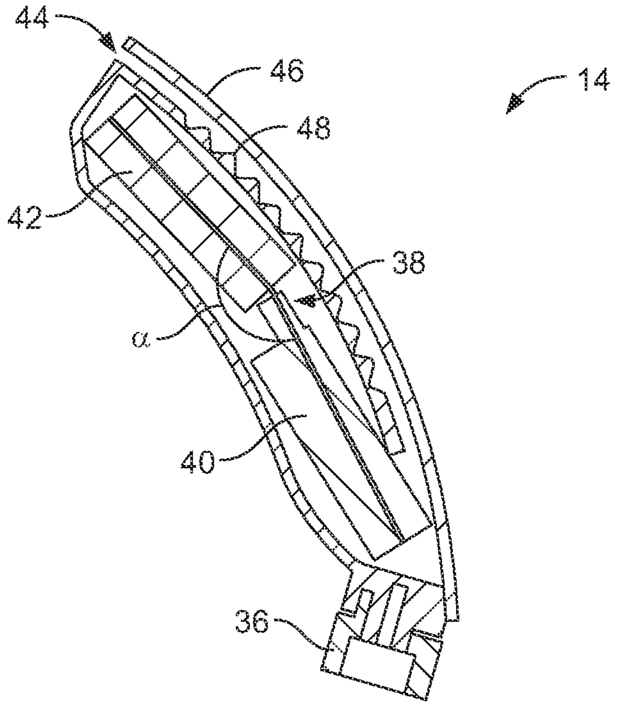
FIG. 4 is an enlarged view of a second end portion of the headband of FIG. 3.

The housing 34 is shaped to follow the curvature of a second side portion 43 of a head 30 of a wearer. The third 40 and fourth 42 batteries are arranged end-on-end within the housing 34 such that end faces of the third 40 and fourth 42 batteries are adjacent to, and at least partially face, one another, with an oblique angle defined between central longitudinal axes of the third 40 and fourth 42 batteries. The use of multiple batteries 40, 42 in such a non-linear arrangement optimises the use of the space available within the curved housing 34 and therefore maximises the energy storage capacity provided by the housing 34. In the present embodiment the angle, denoted by $\alpha$ in FIG. 4 is obtuse, and is in the range of 130-170°. Such an obtuse angle may generally match a curvature of ahead of a wearer.

It will be appreciated that the third 40 and fourth 42 batteries may be removable from the housing 34, or may be intended to be retained within the housing 34 during normal use. Where the third 40 and fourth 42 batteries are intended to be replaceable, the housing 34 may comprise a releasable door or cover to enable access to the internal chamber 38 Where the third 40 and fourth 42 batteries are rechargeable and intended to be retained within the housing 34 in normal use, the housing 34, or indeed other components of the wearable electronic device 100, for example an electronic component housing, may comprise a charge port to enable recharging of the third 40 and fourth 42 batteries. Where the charge port is remote from the housing 34, an appropriate electrical connection, for example wiring, may extend between the charge port and the housing 34. In some examples, a single charge port is provided for charging batteries within both the housing 18 of the first end portion 12 and the housing 34 of the second end portion 14, for example with appropriate wiring extending through the headband 10 between the first 12 and second 14 end portions.

The housing 34 of the second end portion 14 is shown in a close-up cross-sectional view in FIG. 4. As can be seen, the housing 34 defines a channel 44 for receiving a second arm 56 of the central portion 16. The channel 44 has a smooth wall 46, and a toothed wall 48. The toothed wall 48 engages in use with the second arm 56 of the central portion 16 so as to retain the central portion 16 at various positions relative to the second end portion 14. In such a manner the length of the headband 10 may be adjusted by motion of the second arm 56 into and out of the channel 44, and hence may be thought of as an extension mechanism for adjusting a length of the headband 10. It will be appreciated that the engagement between the second arm 56 and the toothed wall 48 is sufficient to enable retention of the relative positioning of the second end portion 14 and the central portion 16 in the absence of any applied force by a user.

The swivel connector 36 is a conventional swivel connector that enables relative rotational movement, and comprises a recess or socket for receiving a swivel pin 110, 210 of the second electronic component housing 104,204, such that the swivel pin 110, 210 rotates within the recess in use.

The central portion 16 has a carrier 50 and a contact portion 52. The carrier 50 is elongate and arcuate in form, and first 54 and second 56 arms extend outwardly from opposing ends of the carrier 50. As shown in FIG. 2, for example, the first 54 and second 56 arms are integrally formed in one piece with the carrier 50, although it will be recognised that other arrangements are possible. The carrier 50 is curved to correspond to the curvature of a top 58 of a head 30 of a user. The first 54 and second 56 arms are generally flat and arcuate in form, and have a thickness that is less than a thickness of the carrier 50. This enables the first 54 and second 56 arms to be relatively flexible compared to the carrier 50, and may provide for increased flexibility of the headband 10. The contact portion 52 is formed of a deformable material to provide comfort when engaged with the top 58 of the head 30 of the wearer in use. The contact portion 52 is formed of a material that is relatively softer than the carrier 50 so as to provide increased comfort for a wearer.

As previously described above, the first 54 and second 56 arms interact with the first 12 and second 14 end portions to provide extension mechanisms that enable the length of the headband 10 to be selectively increased or decreased by a user, for example via engagement of one or more teeth with the toothed wall2 32,48. As will be appreciated, either the arms 54,56 or the first 12 and second 14 end portions may have a stop mechanism to prevent complete removal of the arms 54,56 from their respective channels 28,44.

By having the first through fourth batteries 24,26,40,42 disposed in the first 12 and second 14 end portions, the weight of the batteries may be removed from the top 58 of the head 30 of the wearer compared to an arrangement with batteries in the central portion 16, and batteries at either end of the headband 10 may provide a balanced weight distribution, which may lead to greater wearer comfort. As the batteries 24,26,40,42 are located in the first 12 and second 14 end portions as opposed to the central portion 16, the central portion 16 may be provided with more padding than an arrangement in which the batteries 24,26,40,42 are within the central portion 16, which may provide increased comfort for the wearer.

Location of the batteries 24,26,40,42 in the end portions 12,14 of the headband 10 as opposed to the central portion 16 of the headband 10 may also ensure that the batteries 24,26,40,42 are closer to an electronic device supported by the headband 10, which may reduce a length of wiring required from the batteries 24,26,40,42 to an electronic device, and hence may reduce power loss.

Furthermore, spacing between the battery compartments and a wearer's head may provide for better heat distribution and increased wearer comfort relative to an arrangement where a battery compartment contacts a head of a wearer. Spacing the first 12 and second 14 end portions away from a head of a wearer may also reduce an amount of padding required for the first 12 and second 14 end portions, which may reduce a cost of manufacture.

Figure 5:
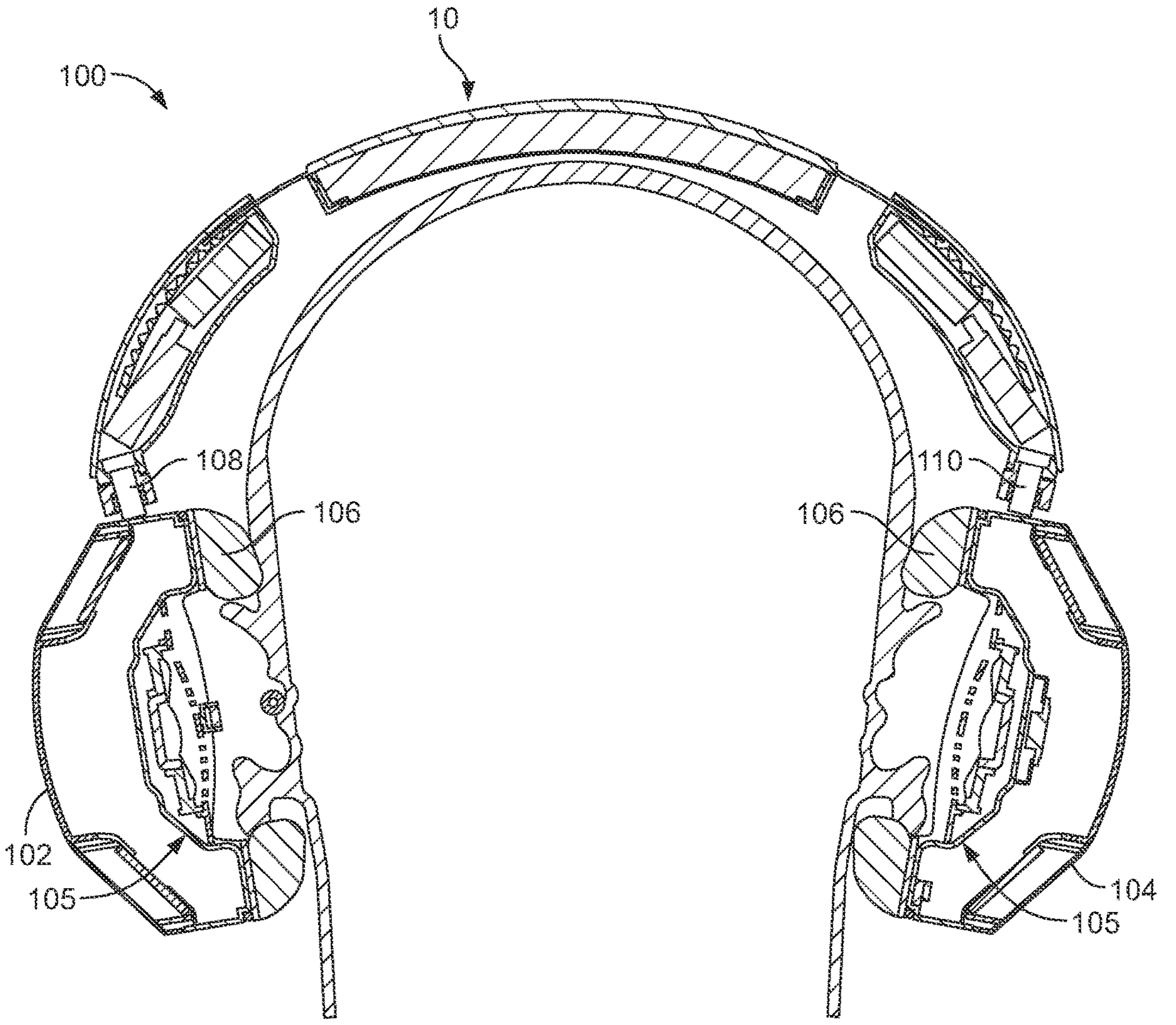
FIG. 5 is a schematic cross-sectional view of a first embodiment of a wearable electronic device incorporating the headband of FIG. 1.

A first embodiment of a wearable electronic device 100 incorporating the headband 10 is shown schematically in cross-section in FIG. 5. Here, the wearable electronic device 100 is in the form of a pair of headphones, and hence may be referred to as such herein. The pair of headphones 100 has a first electronic component housing 102 connected to the first end portion 12 of the headband 10, and a second electronic component housing 104 connected to the second end portion 14 of the headband 10. In the embodiment shown, the first 102 and second 104 electronic component housings are ear cups such as those typically used for so-called "over-the-ear" headphones, and are generally hemi-spherical and hollow in form.

Each electronic component housing 102,104 houses a speaker assembly 105. Such speaker assemblies 105 are known to a person skilled in the art, and so will not be described here for the sake of brevity, save to say that each speaker assembly 105 is capable of receiving audio data from an audio data source, and converting the audio data to sound for delivery to a wearer of the pair of headphones 100. Each electronic component housing 102,104 comprises annular padding 106 configured to surround an ear 108 of a wearer of the pair of headphones 100. In use, the speaker assemblies 105 received within the first 102 and second 104 electronic component housings are configured to receive power from all of the first through fourth batteries 24,26,40,42. Power transfer wiring (not shown) runs through the headband 10 between the first 12 and second 14 end portions (for example, through the carrier 50 and arms 54,56) in order to connect the first 24 and second 26 batteries to the third 40 and fourth 42 batteries. This arrangement provides increased flexibility in power distribution between the speaker assemblies 105. In other embodiments, the speaker assemblies 105 received within the first 102 and second 104 electronic component housings may receive power from batteries disposed in respective ones of the first 12 and second 14 portions of the headband. For example, a speaker assembly 105 received within the first electronic component housing 102 may be configured to be powered by the first 24 and second 26 batteries within the first end portion 12 of the headband 10, whilst a speaker assembly 105 received within the second electronic component housing 104 may be configured to be powered by the third 40 and fourth 42 batteries within the second end portion 14 of the headband 10.

The first electronic component housing 102 is rotatably connected to the first end portion 12 of the headband 10 via a swivel pin 108 received within a recess of the swivel connector 20 to allow the first electronic component housing 102 to swivel relative to the headband 10. Here the swivel pin 108 is shown as having a generally T-shaped cross-section, with an enlarged head that retains the swivel pin 108 in the recess whilst allowing rotation. It will, however, be appreciated that other forms of connection that enable relative motion between the first electronic component housing 102 and the first end portion 12 are envisaged. To enable electrical connection of the first 24 and second 26 batteries to the speaker assembly 105 housed within the first electronic component housing 102, the swivel pin 108 is hollow such that a power transfer wire passes therethrough.

Similarly, the second electronic component housing 104 is rotatably connected to the second end portion 14 of the headband 10 via a swivel pin 110 received within a recess of the swivel connector 36. Here the swivel pin 110 is shown as having a generally T-shaped cross-section, with an enlarged head that retains the swivel pin 110 in the recess whilst allowing rotation. It will, however, be appreciated that other forms of connection that enable relative motion between the second electronic component housing 104 and the second end portion 14 are envisaged. To enable electrical connection of the third 40 and fourth 42 batteries to the speaker assembly 105 housed within the second electronic component housing 104, the swivel pin 110 is hollow such that a power transfer wire passes therethrough.

It will be appreciated that the speaker assemblies 105 may be wireless speaker assemblies that receive audio data wirelessly from an audio data source, for example via a Bluetooth® connection of the like, or alternatively that the speaker assemblies 105 may be wired speaker assemblies that receive audio data via a wired connection to an audio data source. Wired speaker assemblies 105 may require an input connector formed on at least one of the electronic component housings 102,104, with such input connectors being known to a person skilled in the art.

Figure 6:
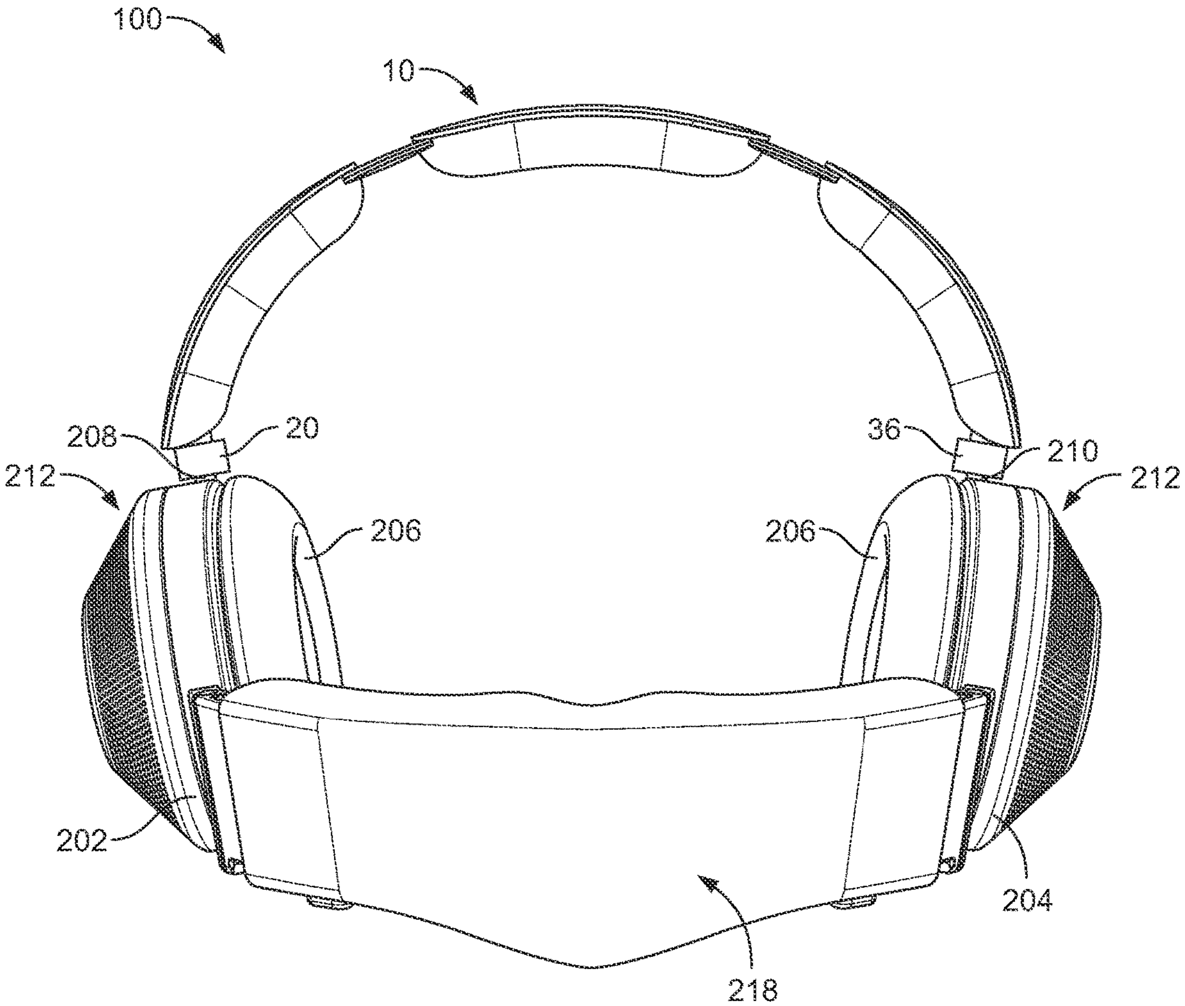
FIG. 6 is a schematic view of a second embodiment of a wearable electronic device incorporating the headband of FIG. 1.
Figure 7:
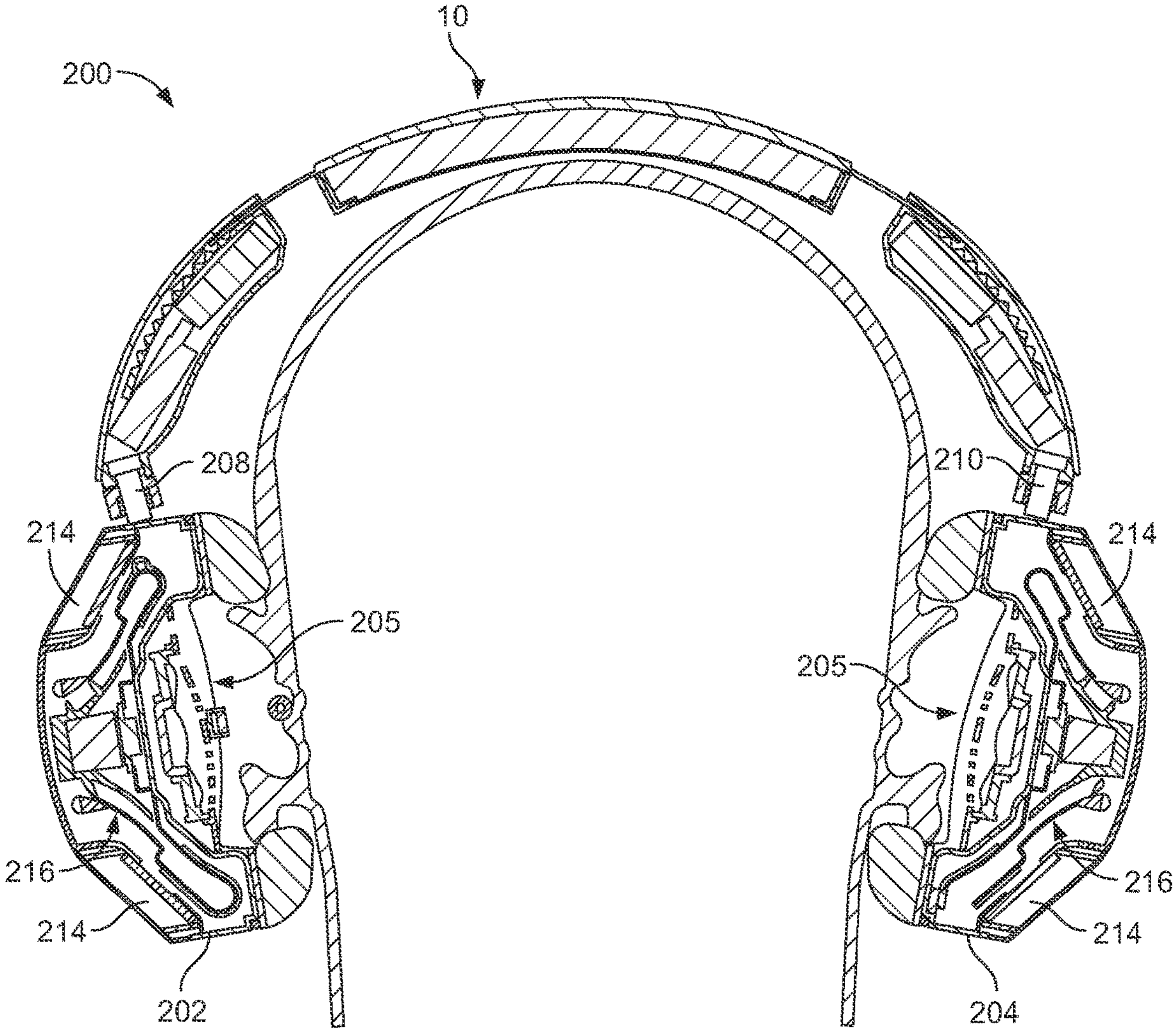
FIG. 7 is a schematic cross-sectional view of the wearable electronic device of FIG. 6 with the nozzle assembly removed.

A second embodiment of a wearable electronic device 200 incorporating the headband 10 is shown schematically in FIGS. 6 and 7. Here, the wearable electronic device 200 includes components for air purification in addition to speaker assemblies, and hence may be referred to as a wearable air purifier, herein.

Similar to the pair of headphones 100 shown in FIG. 5, the wearable air purifier 200 of FIGS. 6 and 7 has a first electronic component housing 202 connected to the first end portion 12 of the headband 10, and a second electronic component housing 204 connected to the second end portion 14 of the headband 10, with the first 202 and second 204 electronic component housings comprising ear cups such as those typically used for so-called "over-the-ear" headphones, which are generally hemi-spherical and hollow in form.

Each electronic component housing 202,204 houses a speaker assembly 205, and comprises annular padding 206 configured to surround an ear 208 of a wearer of the wearable air purifier 200. In use, the speaker assemblies 205 received within the first 202 and second 204 electronic component housings are configured to receive power from all of the first through fourth batteries 24,26,40,42. Power transfer wiring (not shown) runs through the headband 10 between the first 12 and second 14 end portions (for example, through the carrier 50 and arms 54,56) in order to connect the first 24 and second 26 batteries to the third 40 and fourth 42 batteries. This arrangement provides increased flexibility in power distribution between the speaker assemblies 105. In other embodiments, the speaker assemblies 105 received within the first 102 and second 104 electronic component housings may receive power from batteries disposed in respective ones of the first 12 and second 14 portions of the headband. For example, a speaker assembly 205 received within the first electronic component housing 202 may be configured to be powered by the first 24 and second 26 batteries within the first end portion 12 of the headband 10, whilst a speaker assembly 205 received within the second electronic component housing 204 may be configured to be powered by the third 40 and fourth 42 batteries within the second end portion 14 of the headband 10.

The first electronic component housing 202 is rotatably connected to the first end portion 12 of the headband 10 via a swivel pin 208 received within a recess of the swivel connector 20 to allow the first electronic component housing 102 to swivel relative to the headband 10. Here the swivel pin 208 is shown as having a generally T-shaped cross-section, with an enlarged head that retains the swivel pin 208 in the recess whilst allowing rotation. It will, however, be appreciated that other forms of connection that enable relative motion between the first electronic component housing 102 and the first end portion 12 are envisaged. To enable electrical connection of the first 24 and second 26 batteries to the speaker assembly 205 housed within the first electronic component housing 202, the swivel pin 208 is hollow such that a power transfer wire passes therethrough.

Similarly, the second electronic component housing 204 is rotatably connected to the second end portion 14 of the headband 10 via a swivel pin 210 received within a recess of the swivel connector 36. Here the swivel pin 210 is shown as having a generally T-shaped cross-section, with an enlarged head that retains the swivel pin 210 in the recess whilst allowing rotation. It will, however, be appreciated that other forms of connection that enable relative motion between the second electronic component housing 204 and the second end portion 14 are envisaged. To enable electrical connection of the third 40 and fourth 42 batteries to the speaker assembly 205 housed within the second electronic component housing 204, the swivel pin 210 is hollow such that a power transfer wire passes therethrough.

The first 202 and second 204 electronic component housings of the wearable air purifier 200 each comprise an air inlet 212, a filter assembly 214, an air outlet (not shown) and an airflow generator 216.

The air inlet 212 of each of the first 202 and second 204 electronic component housings comprises a plurality of apertures through which air may be drawn into the interior of the electronic component housing 202,204. Each filter assembly 214 is disposed within a respective electronic component housing 202,204 between the air inlet 212 and a respective airflow generator 216. Each filter assembly 214 comprises a filter material chosen to provide a desired degree of filtration of air to be provided to a wearer in use.

The airflow generators 216 each comprise a motor driven impeller which draw air from the respective air inlet 212, through the respective filter assembly 214, and output air through the respective air outlet (not shown), of the electronic component housings 202,204. The airflow generators in the first electronic component housing 202 and second 204 electronic component housings are configured to receive power from all of the first through fourth batteries 24,26, 40,42. Power transfer wiring (not shown) runs through the headband 10 between the first 12 and second 14 end portions (for example, through the carrier 50 and arms 54,56) in order to connect the first 24 and second 26 batteries to the third 40 and fourth 42 batteries. In other embodiments, the airflow generator in the first electronic component housing 202 may be configured to be powered by the first 24 and second 26 batteries within the first end portion 12 of the headband 10, whilst the airflow generator 216 in the second electronic component housing 204 may be configured to be powered by the third 40 and fourth 42 batteries within the second end portion 14 of the headband 10. This may allow at least one airflow generator 216 to be operable in the event of failure of either the first 24 and second 26 batteries, or the third 40 and fourth 42 batteries.

The wearable air purifier 200 comprises a nozzle 218 for providing airflow to a wearer in use, as shown in FIG. 6. The nozzle 218 is generally arcuate in form, and is connected between an air outlet of the first electronic component housing 202 and an air outlet of the second electronic component housing 204. The nozzle has nozzle inlets, not shown, in end regions 220 that are configured to receive airflow from respective air outlets of the first 202 and second 204 electronic component housings in use. A wearer facing side of the nozzle has a nozzle outlet, not shown, through which airflow can be delivered to a wearer in use. The nozzle 218 is configured so as to closely overlie a mouth and lower nasal region of a wearer in use, without contacting the wearer, such that the nozzle outlet is able to deliver airflow to the mouth and nose of the wearer.

In use the airflow generators 216 draw air through the air inlets 212, through the filter assemblies 214, and expel filtered airflow through the air outlets into the nozzle inlets of the nozzle 218. Filtered airflow travels through the nozzle 218 and is delivered from the nozzle 218, via the nozzle outlet, to the wearer of the wearable air purifier 200. The speaker assemblies 205 may provide audio data to a user, for example in the form of music and the like, and alternatively or additionally may provide noise cancellation for noise caused by operation of the airflow generators 216.

Although depicted here with two airflow generators 216, each feeding one end of the nozzle 218, it will be appreciated that in alternative embodiments only a single airflow generator 216 may be provided, which may either feed both or one of the ends of the nozzle 218. It will also be appreciated that the speaker assemblies 205 may not be considered essential to the wearable air purifier, and that embodiments absent the speaker assemblies 205 are envisaged.

It will further be appreciated that, although the specific embodiment of the headband 10 described herein has first and second battery compartments, each connected to the central portion 16 by an extension mechanism, alternative embodiments having only a single battery compartment connected to the central portion 16 by an extension mechanism are also envisaged.

The invention claimed is:

1. A headband for a wearable electronic device, the headband comprising a first end portion, a second end portion, and a central portion disposed between the first and second end portions, the first end portion connected to the central portion by an extension mechanism for adjusting a length of the headband, wherein the first end portion comprises a battery compartment for receiving a battery, and wherein the battery compartment is configured to receive a plurality of batteries such that the plurality of batteries are positioned adjacent to one another with end faces of adjacent batteries at least partially facing one another, and the plurality of batteries are positioned such that an oblique angle is defined between longitudinal axes of adjacent batteries.

2. The headband as claimed in claim 1, wherein one of the first end portion and the central portion comprises a male connector, and the other of the central portion and the first end portion comprises a female connector for receiving the male connector, the male and female connectors configured to allow relative motion between the first end portion and the central portion, and configured to retain the first end portion and the central portion at a plurality of positions relative to one another.

3. The headband as claimed in claim 1, wherein the second end portion comprises a further battery compartment for receiving a further battery.

4. The headband as claimed in claim 3, wherein the further battery compartment is configured to receive a plurality of further batteries such that the plurality of further batteries are positioned adjacent to one another with end faces of adjacent further batteries at least partially facing one another, and the plurality of further batteries are positioned such that an oblique angle is defined between the end faces of adjacent batteries.

5. The headband as claimed in claim 3, wherein the battery compartment and the further battery compartment are configured to house equal numbers of batteries.

6. The headband as claimed in claim 3, wherein the second end portion is connected to the central portion by a further extension mechanism for adjusting the length of the headband.

7. The headband as claimed in claim 6, wherein the extension mechanism and the further extension mechanism are the same type of extension mechanism.

8. A wearable electronic device comprising the headband as claimed in claim 1.

9. The wearable electronic device as claimed in claim 8, wherein the first end portion of the headband is connected to a housing within which an electronic component is disposed, the electronic component configured to be powered by a battery received within the battery compartment in use.

10. The wearable electronic device as claimed in claim 9, wherein the electronic component comprises one or more of a speaker and an airflow generator for generating an airflow.

11. The wearable electronic device as claimed in claim 8, wherein the second end portion of the headband is connected to a further housing within which a further electronic component is disposed.

12. The wearable electronic device as claimed in claim 11, wherein the further electronic component is configured to be powered by a battery received within the battery compartment in use.

13. The wearable electronic device as claimed in claim 11, wherein the further electronic component is configured to be powered by a further battery received within the further battery compartment in use.

14. The wearable electronic device as claimed in claim 11, wherein the electronic component and the further electronic component are both configured to be powered by the battery received within the battery compartment and by a further battery received within the further battery compartment in use.

15. The wearable electronic device as claimed in claim 11, wherein the further electronic component comprises one or more of a speaker and an airflow generator for generating an airflow.

16. The wearable electronic device as claimed in claim 8, wherein the wearable device comprises a nozzle for providing airflow from an airflow generator to a wearer of the wearable electronic device in use.

17. A headband for a wearable electronic device, the headband comprising a first end portion, a second end portion, and a central portion disposed between the first and second end portions, the first end portion connected to the central portion by an extension mechanism for adjusting a length of the headband, wherein the first end portion comprises a battery compartment for receiving a battery;

wherein one of the first end portion and the central portion comprises a male connector, and the other of the central portion and the first end portion comprises a female connector for receiving the male connector, the male and female connectors configured to allow relative motion between the first end portion and the central portion, and configured to retain the first end portion and the central portion at a plurality of positions relative to one another.

18. A headband for a wearable electronic device, the headband comprising a first end portion, a second end portion, and a central portion disposed between the first and second end portions, the first end portion connected to the central portion by an extension mechanism for adjusting a length of the headband, wherein the first end portion comprises a battery compartment for receiving a battery, wherein the second end portion comprises a further battery compartment for receiving a further battery, wherein the further battery compartment is configured to receive a plurality of further batteries such that the plurality of further batteries are positioned adjacent to one another with end faces of adjacent further batteries at least partially facing one another, and the plurality of further batteries are positioned such that an oblique angle is defined between the end faces of adjacent batteries.

* * * * *